United States Patent
Soejima et al.

(10) Patent No.: US 8,243,290 B2
(45) Date of Patent: Aug. 14, 2012

(54) THREE-DIMENSIONAL BASE SETTING METHOD FOR IMAGE DATA

(75) Inventors: Takeo Soejima, Hachioji (JP); Yusei Ohkubo, Hachioji (JP)

(73) Assignee: JASCO Corporation, Hachioji-shi, Tokyo (JP)

( * ) Notice: Subject to any disclaimer, the term of this patent is extended or adjusted under 35 U.S.C. 154(b) by 231 days.

(21) Appl. No.: 12/758,827

(22) Filed: Apr. 13, 2010

(65) Prior Publication Data
US 2011/0141490 A1 Jun. 16, 2011

(30) Foreign Application Priority Data
Dec. 11, 2009 (JP) .................................. 2009-281387

(51) Int. Cl.
*G01B 11/14* (2006.01)
(52) U.S. Cl. ........................................................ 356/625
(58) Field of Classification Search .................. 356/625; 702/5
See application file for complete search history.

(56) References Cited

U.S. PATENT DOCUMENTS
2001/0030286 A1 10/2001 Egawa et al.

FOREIGN PATENT DOCUMENTS
JP 5-60614 3/1993

OTHER PUBLICATIONS

European Search Report for corresponding Application No. 10159801.9 mailed Sep. 8, 2010, four pages.
Yurov et al. "Scanning Tunneling Microscope Calibration and Reconstruction of Real Image: Drift and Slope Elimination," Rev. Sci. Instrum., vol. 65, No. 5, May 1994, pp. 1551-1557.
Patent Abstract for Japanese Publication No. 05060614 published Dec. 3, 1993, one page.

*Primary Examiner* — Roy M Punnoose
(74) *Attorney, Agent, or Firm* — Rankin, Hill & Clark LLP

(57) ABSTRACT

A highly accurate three-dimensional measurement base is specified with simple settings. When a peak occurs in the positive Z-axis direction, a hemisphere or semi-spheroid figure ($z \geq 0$) is placed to contain a position ($x_i$, $y_i$) where a base point should be obtained, scanning is performed such that the bottom of the figure contains the position ($x_i$, $y_i$), and the minimum value $l_{min}$ of the difference between the Z position of a surface profile image and the height of the hemisphere or semi-spheroid figure at each position, and the height of the hemisphere or semi-spheroid figure at the position ($x_i$, $y_i$) are obtained. The maximum value of the sums is expressed as $L_{(xi, yi)}$, and a base point ($X_i$, $Y_i$, $L_{(xi,yi)}$) is specified. Base points are specified throughout the target surface by the same base point setting method, and a three-dimensional measurement base is specified on the basis of the specified base points.

6 Claims, 6 Drawing Sheets

$(X_i, Y_i)$

THREE-DIMENSIONAL BASE SETTING METHOD FOR IMAGE DATA

FIELD OF THE INVENTION

The present invention relates to base correction methods for image data, and more specifically, to correction of base distortion in surface analyses.

DESCRIPTION OF THE RELATED ART

Besides point analyses and line analyses, surface analyses are performed in surface profile image measurement by specimen surface analyzing apparatuses such as a scanning electron microscope (SEM) and an electron probe microanalyzer (EPMA) or a scanning probe microscope (SPM) and, in measurement by Fourier Transform Infrared (FT-IR) spectrometers, Raman spectrometers, and the like.

In the surface profile image measurement or the like performed by a scanning probe microscope (SPM), the surface of the specimen is scanned linearly, and the scanning axis is shifted gradually. Here, the SPM measures a very small analysis area on the order of nanometers at each measurement point. Since the analysis at each measurement point may take a long time, surface analysis of a large surface of a specimen can take a longer time as the number of analysis points increases. In that type of analysis, specifying many analysis points from the beginning is undesirable in terms of efficiency. In most cases, the measurement is started with fewer analysis points specified over the surface of the specimen; the result of measurement is checked to determine the area to be analyzed in detail; and that area is measured.

Even if the number of analysis points in measurement is reduced, when the analysis time per measurement point is rather long, the influence of a mechanical drift increases as the final phase of the surface analysis approaches. For example, if measurement on the X-axis is made first by shifting the scanning axis gradually in the Y-axis direction, the effect of mechanical drift, mainly thermal drift, increases as the measurement advances in the Y-axis direction as time goes by. Then, in the final stage of measurement, the scanning axis is likely to be affected by the drift, and accurate analysis in the Z-axis direction would be impossible.

If a position in the surface profile image is distorted upward or downward on the Z axis because of the drift of the apparatus, the Z-axis scale becomes large in the surface profile image obtained by the surface analysis and displayed as a three-dimensional image. This reduces the peaks in comparison with the Z-axis scale and makes it difficult to recognize the peaks visually. It is inconvenient for the measuring person to determine the area to be analyzed in detail on the basis of the measurement result. Therefore, it becomes necessary to correct the base distortion resulting from the drift of the apparatus or the thermal drift.

In conventional operation, correction points have been specified manually on the surface profile image, and processing to correct base distortion has been performed. One of concrete examples is Japanese Unexamined Patent Application Publication No. Hei-05-60614. The manual correction processing, however, requires much skill and takes a lot of time and effort. In other conventional processing, a model or function is selected; a baseline is obtained by performing curve fitting based on parameters and is subtracted from the Z-axis value at each position. This process also requires much skill in the selection of an appropriate model because the operator must have accurate knowledge of the characteristics and parameters of the model to be selected. Therefore, in surface analysis, a new method of creating an accurate three-dimensional measurement base by a simple setting operation has been desired instead of the conventional base distortion correction methods.

SUMMARY OF THE INVENTION

In view of the related art described above, it is an object of the present invention to provide a three-dimensional base setting method for correcting a base distorted under the influence of mechanical drift or the like in surface analysis, which takes a long measurement time.

When a peak on a measurement surface occurs in the positive Z-axis direction, a base point is specified with respect to the measurement surface by a base point setting method according to the present invention as described below.

The base point setting method is for a three-dimensional measurement surface which has an X-axis and a Y-axis in an X-Y plane with respect to a target surface and a measurement value axis Z extending perpendicularly to the X-Y plane at the intersection of the X-axis and the Y-axis and which specifies one measured value $Z_{(x, y)}$ for a position (x, y) on the target surface. In the base point setting method, parameters d and e are specified in such a manner that the bottom of a hemisphere or semi-spheroid figure C [$z \geq 0$, $f(x, y) = c\{1-(x-d)^2/a^2-(y-e)^2/b^2\}^{1/2}$] contains a position $(x_i, y_i)$ where a base point should be specified; the height of the figure C is subtracted from a measured value Z at each position of the bottom of the figure C, and the minimum value of the differences is expressed as $l_{min}$; the height of the figure C is obtained at the position $(x_i, y_i)$ where the minimum value $l_{min}$ is obtained and the minimum value $l_{min}$ is added to the height of the figure C at the position $(x_i, y_i)$; the figure C is shifted throughout in a range in which the bottom of the figure C contains the position $(x_i, y_i)$, and the minimum value $l_{min}$ is added to the height of the figure C at the position $(x_i, y_i)$, in each of the shifted positions of the figure C; and the maximum value of the sums is expressed as $L_{(xi, yi)}$, and the base point is specified as $(x_i, y_i, L_{(xi, yi)})$ at the position $(x_i, y_i)$ on the target surface.

The foregoing object is achieved in one aspect of the present invention through the provision of a three-dimensional measurement base setting method in which base points are specified throughout the target surface by the base point setting method described above, and a three-dimensional measurement base is specified on the basis of the specified base points.

When a peak on a measurement surface occurs in the negative Z-axis direction, a base point is specified with respect to the measurement surface by a base point setting method according to the present invention as described below.

The base point setting method is for a three-dimensional measurement surface which has an X-axis and a Y-axis in an X-Y plane with respect to a target surface and a measurement value axis Z extending perpendicularly to the X-Y plane at the intersection of the X-axis and the Y-axis and which specifies one measured value $Z_{(x, y)}$ for a position (x, y) on the target surface. In the base point setting method, parameters d and e are specified in such a manner that the bottom of a hemisphere or semi-spheroid figure C [$z \leq 0$, $f(x, y) = c\{1-(x-d)^2/a^2-(y-e)^2/b^2\}^{1/2}$] contains a position $(x_i, y_i)$ where a base point should be specified; a measured value Z is subtracted from the height of the figure C at each position of the bottom of the figure C, and the minimum value of the differences is expressed as $l_{min}$; the height of the figure C is obtained at the position $(x_i, y_i)$ where the minimum value $l_{min}$ is obtained and the minimum value $l_{min}$ is subtracted from the height of the figure C at the position $(x_i, y_i)$; the figure C is shifted throughout in a range in which the bottom of the figure C contains the position $(x_i, y_i)$, and the minimum value $l_{min}$ is subtracted from the height of the figure C at the position $(x_i, y_i)$, in each of the shifted positions of the figure C; and the minimum value of the sums is expressed as $L_{(xi, yi)}$, and the base point is specified as $(x_i, y_i, L_{(xi, yi)})$ at the position $(x_i, y_i)$ on the target surface.

The foregoing object is achieved in another aspect of the present invention through the provision of a three-dimensional measurement base setting method in which base points are specified throughout the target surface by the base point setting method described above, and a three-dimensional measurement base is specified on the basis of the specified base points.

It is preferable to adjust the parameters a and b so that the X dimension of the bottom of the hemisphere or semi-spheroid figure is set to a value greater than or equal to twice the half-value width of the peak in the X-axis direction and the Y dimension is set to a value greater than or equal to twice the half-value width in the Y-axis direction. If the measurement surface rises or drops steadily from left to right or has a mountain shape, a valley shape, or a wavy shape, it is preferable especially to adjust the parameter c in accordance with the shape and inclination of the bases specified with respect to the entire target surface.

When the parameters a, b, and c are specified appropriately, the base points are prevented from being set higher than the peak.

As described above, a base point can be obtained by using the base point setting methods of the present invention. Base points for points on the whole target surface can also be specified by using the base point setting methods. By using those base points, a highly accurate three-dimensional measurement base can be generated easily.

If a hemisphere or semi-spheroid figure is moved along the Z position of a surface profile image as in the related art, the movement of the figure is complicated and requires manual intervention. According to the present invention, however, the figure should be moved only in a direction parallel to the X-Y plane, and movement in the Z-axis direction is not required. The simple movement of the figure does not require manual intervention other than initial parameter setting, and a three-dimensional measurement base can be specified nearly automatically.

By adjusting the parameters a and b of the hemisphere or semi-spheroid figure in such a manner that the X dimension of the bottom of the hemisphere or semi-spheroid figure is greater than or equal to twice the half-value width of the peak in the X-axis direction and the Y dimension is greater than or equal to twice the half-value width in the Y-axis direction and by adjusting the parameter c in accordance with the shape of the surface profile image, the base points are prevented from being set higher than the peak. For example, by adjusting the parameters appropriately, a proper three-dimensional measurement base can be specified to any figure, including a figure having an upward back, a figure having a downward back, a mountain-shaped figure, a valley-shaped figure, and a wavy figure.

DESCRIPTION OF THE PREFERRED EMBODIMENTS

Initial Setting of Parameters

A procedure for specifying one base point $(x_i, y_i, z_{B(xi, yi)})$ by using a semi-spheroid figure for a position $(x_i, y_i)$ where a base point should be specified when a peak occurs in the positive Z-axis direction will be described.

Figure 1:
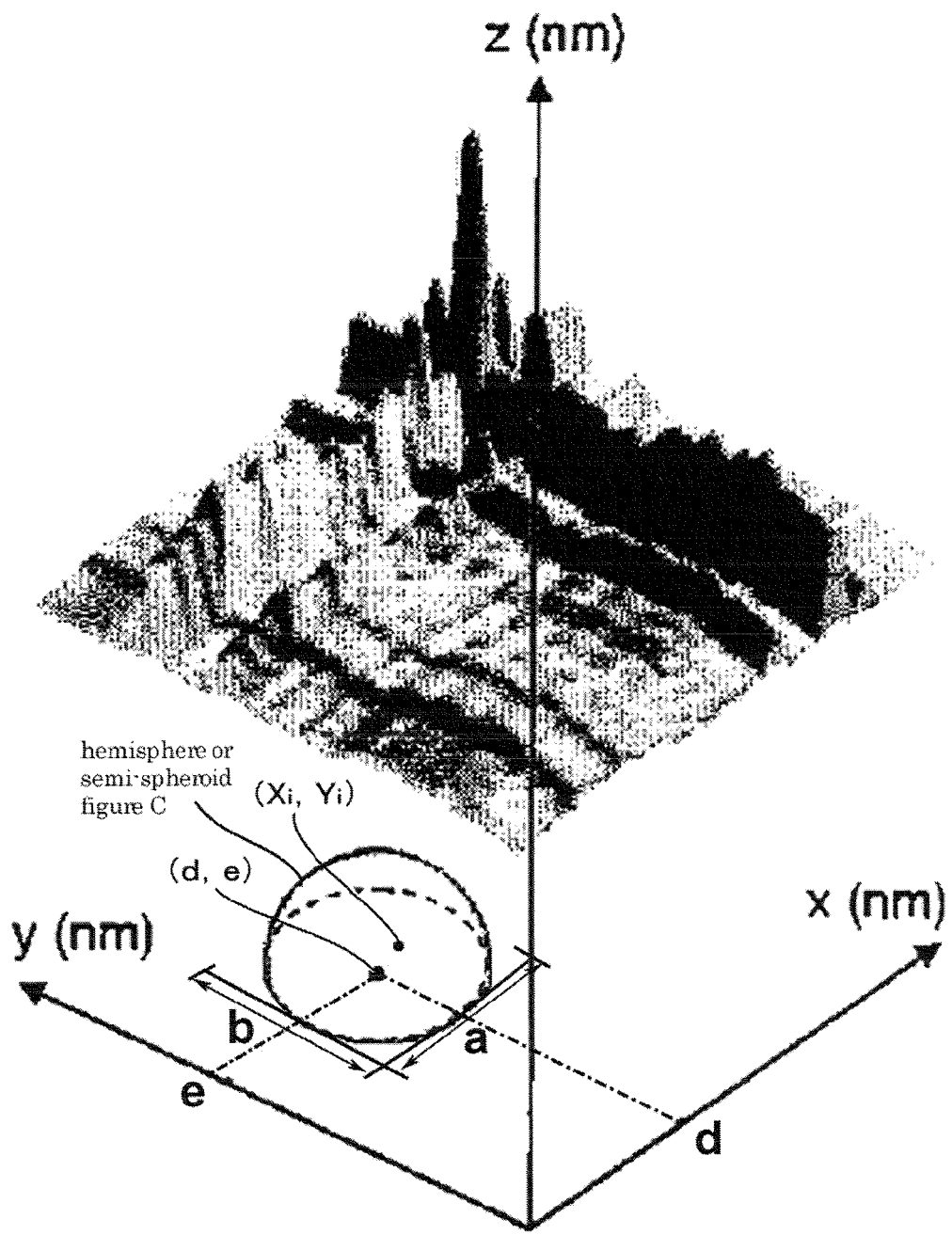
FIG. 1 is a diagram illustrating a hemisphere or semi-spheroid figure C containing, at its bottom, a position $(x_i, y_i)$ where a base point should be specified.

The operator first specifies a semi-spheroid figure C [$z \geq 0$, $f(x, y) = c\{1-(x-d)^2/a^2-(y-e)^2/b^2\}^{1/2}$], corresponding to the shape of the peak of the surface profile image on the Z axis, as shown in FIG. 1. Here, a parameter a is the X dimension of the semi-spheroid figure in the X-Y plane. It is preferable that the parameter a be specified to a value greater than or equal to twice the half-value width of the peak in the X-axis direction. A parameter b is the Y dimension of the semi-spheroid figure in the X-Y plane. It is also preferable that the parameter b be specified to a value greater than or equal to twice the half-value width of the peak in the Y-axis direction. A parameter c should be adjusted appropriately in accordance with the shape of the surface profile figure on the Z-axis. As the value of the parameter c increases, the position of the base point rises.

Since the center of the bottom of the figure C is (d, e), the initial position of the figure C in the X-Y plane can be adjusted by changing parameters d and e. Because the bottom of the figure C must contain the position $(x_i, y_i)$ when the figure C is scanned, the initial position should also be specified in that range. Therefore, the parameters d and e must be specified in such a manner that the bottom contains the position $(x_i, y_i)$ as its initial position.

The operator has to consider just the initial settings of the parameters. No more operation or setting will be required after that, and a three-dimensional measurement base can be specified automatically.

Processing until the Base Point is Obtained

After the operator specifies the parameters, processing described below is performed automatically, and a base point is specified, according to the present invention.

The figure C is first placed in the initial position, and the height of the figure C is subtracted from a measured value Z at each position of the bottom of the figure C. The minimum value of the differences is expressed as To obtain the minimum value $l_{min}$, the height of the figure C must be subtracted from the measured value Z at each position at the bottom of the figure C. It is preferable that the position agree with a measurement point.

Obtained next is the height of the figure C at the position $(x_i, y_i)$ when the figure C is in the position where the minimum value $l_{min}$ in was obtained. The minimum value $l_{min}$ and the height of the figure C at the position $(x_i, y_i)$ are added.

Figure 2:
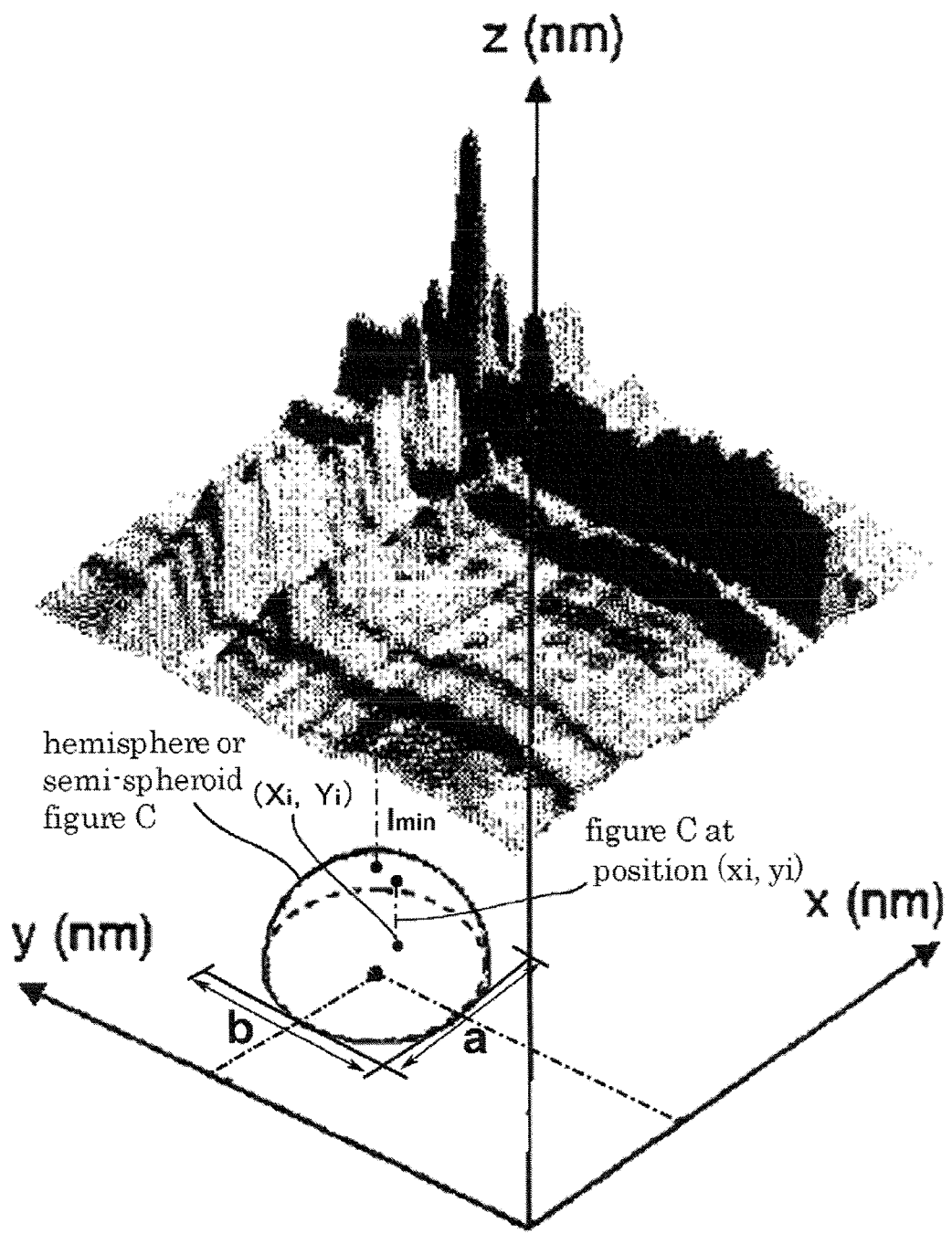
FIG. 2 is a diagram illustrating the height of the figure C at the position $(x_i, y_i)$ where the base point should be specified and a minimum value

FIG. 2 shows the minimum value $l_{min}$ and the height of the figure C at the position $(x_i, y_i)$.

Figure 3:
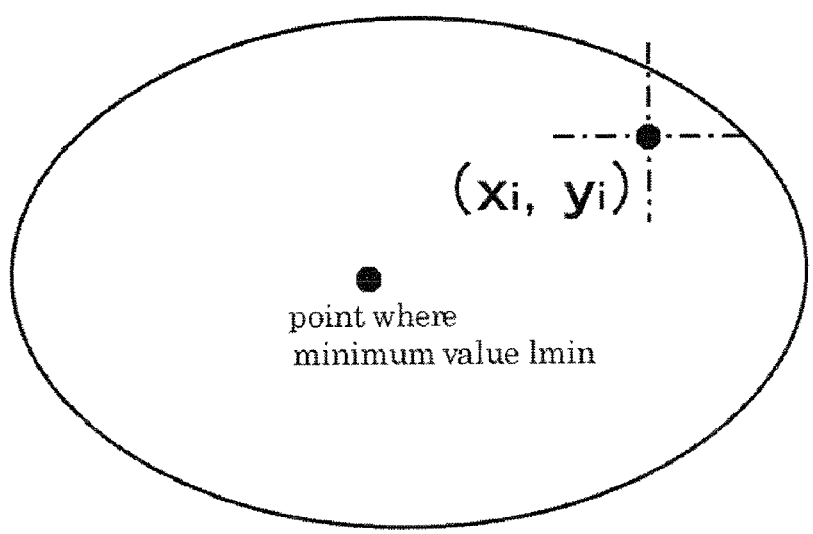
FIG. 3 is a diagram illustrating the positional relationship among the semi-spheroid figure C, the position $(x_i, y_i)$ where the base point should be specified, and the point where the minimum value $l_{min}$ is obtained, viewed from the positive Z-axis direction.

FIG. 3 shows the specific positional relationship, viewed from the positive Z-axis direction, between the position $(x_i, y_i)$ and the position of a point where the minimum value $l_{min}$ is specified.

Figure 4:
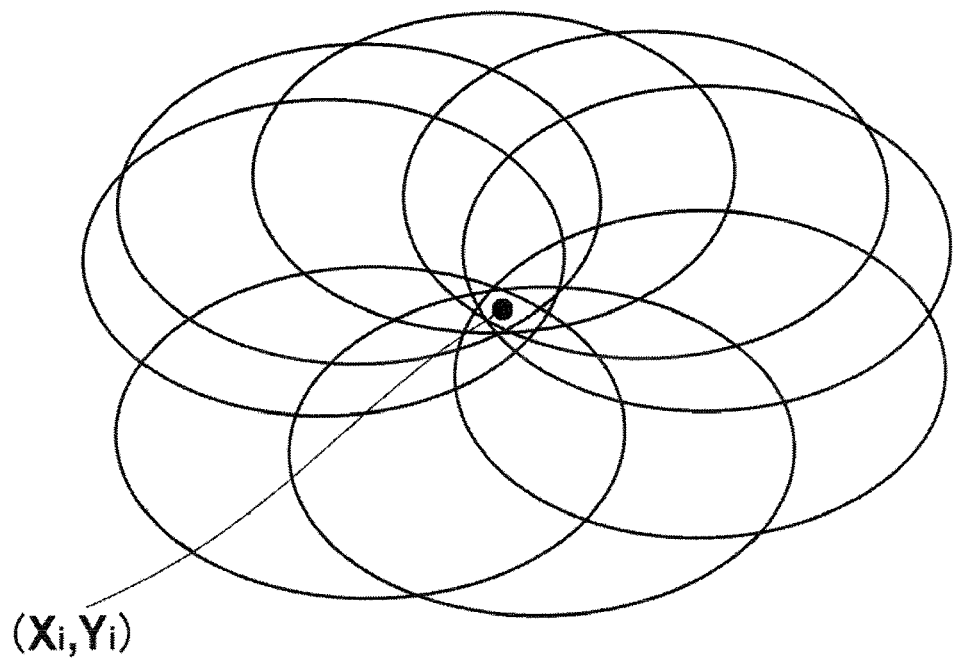
FIG. 4 is a diagram illustrating the positional relationship, viewed from the positive Z-axis direction, between the position $(x_i, y_i)$ and the position of the semi-spheroid figure C when it is moved in a range in which the bottom of the semi-spheroid figure C contains the position $(x_i, y_i)$ where the base point should be specified.

The X-Y plane is scanned by moving the figure C, and the minimum value $l_{min}$ and the height of the figure C at the position $(x_i, y_i)$ are added at each of the scan positions. The figure C must be moved in a range in which the bottom of the figure C contains the position $(x_i, y_i)$. FIG. 4 shows the figure C viewed from the positive Z-axis direction when the figure C is moved near the edge of the range in which the bottom of the figure C contains the position $(x_i, y_i)$.

While the figure C is moved as described above, the minimum value $l_{min}$ and the height of the figure C at the position $(x_i, y_i)$ are added at each position. The maximum value of the sum is expressed as L(xi, yi). Then, the base point at the position $(x_i, y_i)$ in the target surface is specified as $(x_i, y_i, L_{(xi, yi)})$.

The base point is specified as described above.

Other base points are specified evenly over the target surface in the same way. By connecting the points, the base surface is specified as the three-dimensional measurement base.

Figure 5:
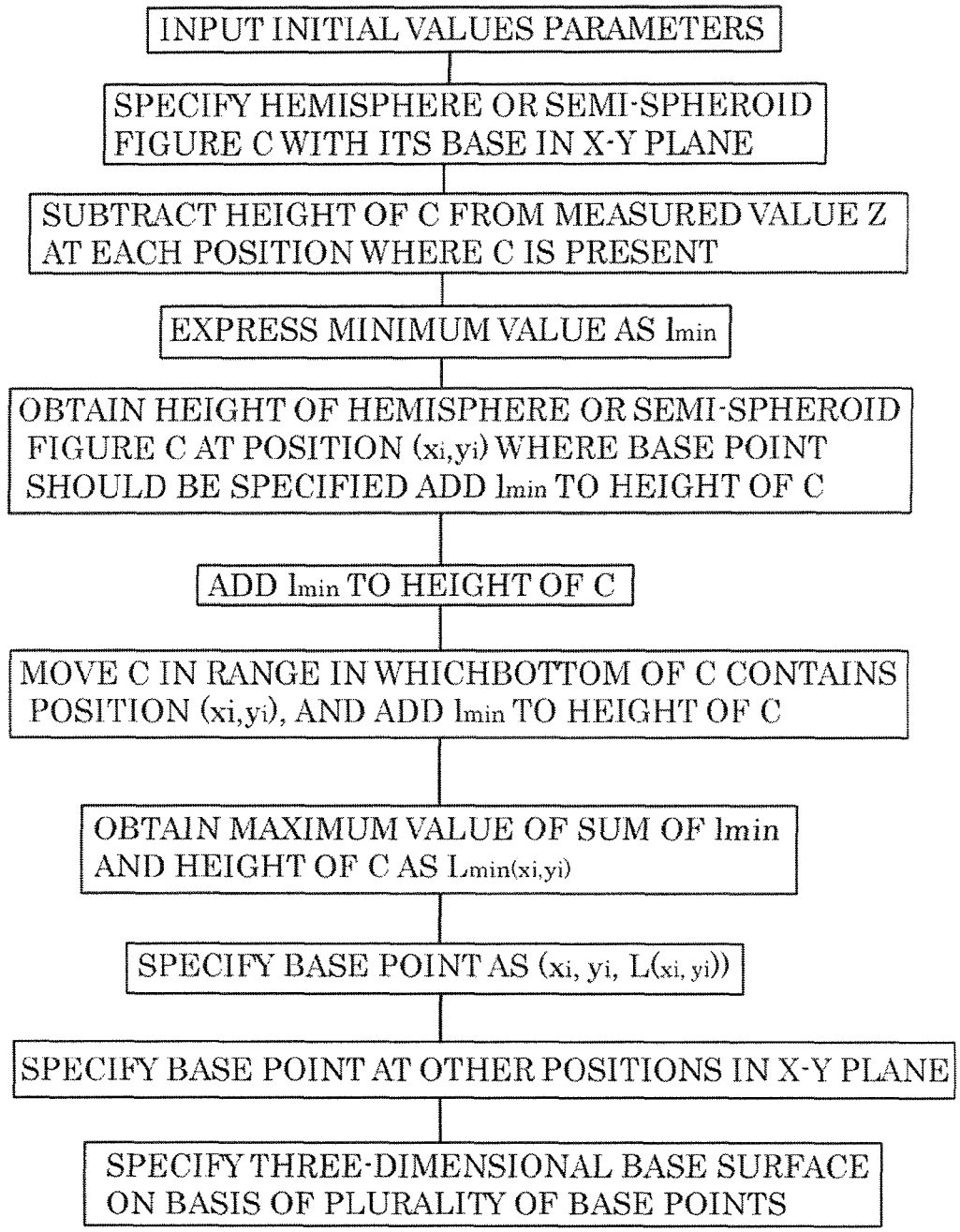
FIG. 5 is a simplified flowchart illustrating processing performed according to the present invention.

FIG. 5 shows a flowchart illustrating the procedure for specifying the three-dimensional measurement base by the method according to the present invention.

When a Peak Occurs in the Negative Z-Axis Direction

When a peak occurs in the negative Z-axis direction, the procedure for setting the base points is essentially the same as that when a peak occurs in the positive Z-axis direction. The differences lie just in the equations utilized to define the hemisphere or semi-spheroid figure C and to calculate the minimum value $l_{min}$ and the maximum value $L(x_i, y_i)$. The differences will be described in detail.

When a peak occurs in the negative Z-axis direction, a first difference lies in the area where the hemisphere or semi-spheroid figure C $[z \leq 0, f(x, y) = c\{1-(x-d)^2/a^2-(y-e)^2/b^2\}^{1/2}]$ is specified.

When a peak occurs in the positive Z-axis direction, the hemisphere or semi-spheroid figure C is specified in the area $z \geq 0$. When a peak occurs in the negative Z-axis direction, the hemisphere or semi-spheroid figure C is specified in the area $z \leq 0$.

A second difference lies in the value obtained at each position at the bottom of the figure C. When the peak is in the positive Z-axis direction, the height of the figure C is subtracted from the measured value Z. When the peak is in the negative Z-axis direction, the measured value Z is subtracted from the height of the figure C at each position at the bottom of the figure C. The minimum value of the differences is expressed as $l_{min}$.

A third difference lies in the value $L_{(xi, yi)}$. When the peak is in the positive Z-axis direction, the minimum value $l_{min}$ and the height of the figure C at the position $(x_i, y_i)$ are added, and the sum is expressed as $L_{(xi, yi)}$. When the peak is in the negative Z-axis direction, the minimum value $l_{min}$ is subtracted from the height of the figure C at the position $(x_i, y_i)$, and the minimum value of the differences is expressed as $L_{(xi, yi)}$.

Even when a peak occurs in the negative Z-axis direction, an appropriate distance can be kept between the base point and the peak if the base point is specified in view of the differences described above.

Figure 6:
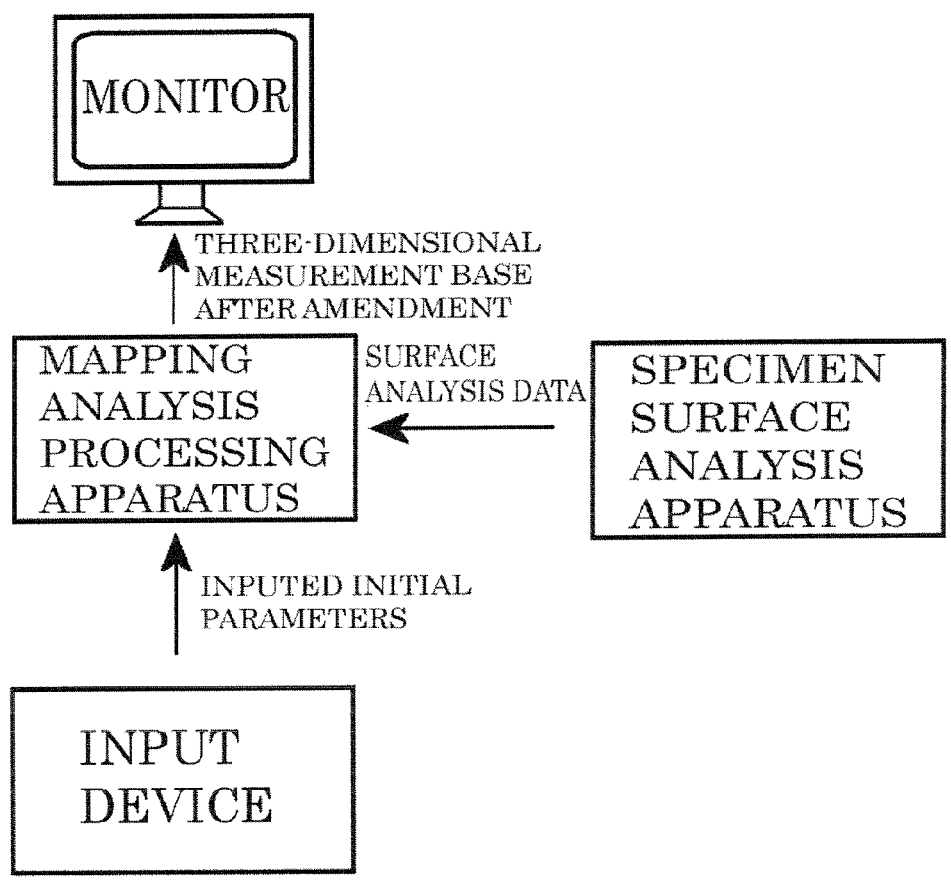
FIG. 6 is a diagram illustrating a general structure of an apparatus to which the present invention is applied.

FIG. 6 shows a general structure of an apparatus to which the present invention is applied.

After initial parameters for specifying the figure C are specified via an input device, a surface profile image is formed on the basis of surface analysis data obtained from the SPM of a specimen surface analysis apparatus. Then, the method of the present invention is used to set the three-dimensional measurement base. The Z position of the surface profile image is corrected by the three-dimensional measurement base, and the corrected surface profile image is displayed on a monitor.

Use of the Three-Dimensional Base Setting Method

The present invention can be applied not only to surface analysis of a measurement target surface by means of an SPM but also to base correction of a contour map, a color-coded map, a bird's-eye view, etc.

A three-dimensional base can be set according to the methods of the present invention not only for analysis apparatuses such as an SPM for obtaining Z position information of a surface profile image but also for Fourier Transform Infrared (FT-IR) spectrometers and Raman spectrometers. For example, a two-dimensional X-Y spectrum is obtained by using an FT-IR spectrometer or a Raman spectrometer to perform mapping measurement and a color-coded map, a contour map, and a bird's-eye view are created in accordance with the height of a specific peak in the spectrum or the height of the baseline at a specific wavenumber in the spectrum, by using a three-dimensional base specified by the methods of the present invention.

What is claimed is:

1. A base point setting method for using a mapping analysis processing apparatus setting a base point to use surface analysis data, at a three-dimensional measurement surface which has an X-axis and a Y-axis in an X-Y plane with respect to a target surface and a measurement value axis Z extending perpendicularly to the X-Y plane at the intersection of the X-axis and the Y-axis and which specifies one measured value $Z_{(x, y)}$ for a position (x, y) on the target surface, the base point setting method comprising the steps of:

setting parameters d and e such that the bottom of a hemisphere or semi-spheroid figure C $[z \geq 0, f(x, y) = c\{1-(x-d)^2/a^2-(y-e)^2/b^2\}^{1/2}]$ contains a position $(x_i, y_i)$ where a base point should be specified, when a peak of the measurement surface occurs in the positive Z-axis direction;

subtracting the height of the figure C from a measured value Z at each position of the bottom of the figure C, and expressing the minimum value of the differences as $l_{min}$;

obtaining the height of the figure C at the position $(x_i, y_i)$ where the minimum value $I_{min}$ is obtained and adding the minimum value $I_{min}$ and the height of the figure C at the position $(x_i, y_i)$;

shifting the figure C throughout in a range in which the bottom of the figure C contains the position $(x_i, y_i)$ and adding the minimum value $I_{min}$ and the height of the figure C at the position $(x_i, y_i)$, in the shifted positions; and expressing the maximum value of the sums as $L_{(xi, yi)}$ and specifying the base point at the position $(x_i, y_i)$ on the target surface as $(x_i, y_i, L_{(xi, yi)})$, wherein the parameter a is the X dimension of the hemisphere or semi-spheroid of the figure C in the X-Y plane;

the parameter b is the Y dimension of the hemisphere or semi-spheroid of the figure C in the X-Y plane;

the parameter c is adjusted in accordance with the shape of the surface of profile of the hemisphere or semi-spheroid of the figure C along the axis Z;

the parameters d and e represent the center of the bottom of the hemisphere or semi-spheroid of the figure C in the X-Y plane; and the mapping analysis processing apparatus processes these steps.

2. A base point setting method according to claim 1, wherein a parameter a for the hemisphere or semi-spheroid figure C [$z \geq 0$, $f(x,y) = c\{1-(x-d)^2/a^2-(y-e)^2/b^2\}^{1/2}$] is set to a value greater than or equal to twice the half-value width of the peak in the X-axis direction, and a parameter b is set to a value greater than or equal to twice the half-value width of the peak in the Y-axis direction.

3. A three-dimensional measurement base setting method, wherein base points are specified throughout the target surface by the base point setting method according to claim 1, and a three-dimensional measurement base is specified on the basis of the specified base points.

4. A base point setting method for using a mapping analysis processing apparatus setting a base point to use surface analysis data, at a three-dimensional measurement surface which has an X-axis and a Y-axis in an X-Y plane with respect to a target surface and a measurement value axis Z extending perpendicularly to the X-Y plane at the intersection of the X-axis and the Y-axis and which specifies one measured value $Z_{(x,y)}$ for a position (x, y) on the target surface, the base point setting method comprising the steps of:

setting parameters d and e such that the bottom of a hemisphere or semi-spheroid figure C [$z \geq 0$, $f(x,y) = c\{1-(x-d)^2/a^2-(y-e)^2/b^2\}^{1/2}$] contains a position ($x_i$, $y_i$) where a base point should be specified, when a peak of the measurement surface occurs in the negative Z-axis direction;

subtracting a measured value Z from the height of the figure C at each position of the bottom of the figure C, and expressing the minimum value of the differences as $l_{min}$;

obtaining the height of the figure C at the position ($x_i$, $y_i$) where the minimum value $I_{min}$ is obtained and subtracting the minimum value $I_{min}$ from the height of the figure C at the position ($x_i$, $y_i$);

shifting the figure C throughout in a range in which the bottom of the figure C contains the position ($x_i$, $y_i$) and subtracting the minimum value $I_{min}$ from the height of the figure C at the position ($x_i$, $y_i$), in the shifted positions; and expressing the minimum value of the differences as $L_{(xi,yi)}$ and specifying the base point at the position ($x_i$, $y_i$) on the target surface as ($x_i$, $y_i$, $L_{(xi,yi)}$), wherein the parameter a is the X dimension of the hemisphere or semi-spheroid of the figure C in the X-Y plane;

the parameter b is the Y dimension of the hemisphere or semi-spheroid of the figure C in the X-Y plane;

the parameter c is adjusted in accordance with the shape of the surface of profile of the hemisphere or semi-spheroid of the figure C along the axis Z;

the parameters d and e represent the center of the bottom of the hemisphere or semi-spheroid of the figure C in the X-Y plane; and the mapping analysis processing apparatus processes these steps.

5. A base point setting method according to claim 4, wherein a parameter a for the hemisphere or semi-spheroid figure C [$z \geq 0$, $f(x,y) = c\{1-(x-d)^2/a^2-(y-e)^2/b^2\}^{1/2}$] is set to a value greater than or equal to twice the half-value width of the peak in the X-axis direction, and a parameter b is set to a value greater than or equal to twice the half-value width of the peak in the Y-axis direction.

6. A three-dimensional measurement base setting method, wherein base points are specified throughout the target surface by the base point setting method according to claim 4, and a three-dimensional measurement base is specified on the basis of the specified base points.

* * * * *